US008857682B2

(12) United States Patent
Nakaya et al.

(10) Patent No.: US 8,857,682 B2
(45) Date of Patent: Oct. 14, 2014

(54) SUSPENDER FOR BRUSHCUTTER

(75) Inventors: Tomomi Nakaya, Wako (JP); Hiroaki Uchitani, Wako (JP)

(73) Assignee: Honda Motor Co., Ltd. (JP)

(*) Notice: Subject to any disclaimer, the term of this patent is extended or adjusted under 35 U.S.C. 154(b) by 1827 days.

(21) Appl. No.: 11/286,381

(22) Filed: Nov. 23, 2005

(65) Prior Publication Data

US 2006/0108387 A1 May 25, 2006

(30) Foreign Application Priority Data

Nov. 24, 2004 (JP) .................. 2004-339554

(51) Int. Cl.
A45F 3/14 (2006.01)
A01D 34/90 (2006.01)

(52) U.S. Cl.
CPC ..................................... A01D 34/90 (2013.01)
USPC ............ 224/257; 224/268; 224/269; 224/265

(58) Field of Classification Search
USPC ......... 224/254, 257, 268, 270, 269, 271, 666, 224/667, 671, 242, 255, 256; 24/600.9, 24/601.5; 248/339, 306, 307, 304, 301, 248/309.2
See application file for complete search history.

(56) References Cited

U.S. PATENT DOCUMENTS

| | | | | |
|---|---|---|---|---|
| 1,466,615 A * | 8/1923 | Falstrault | ...................... | 24/600.9 |
| 1,875,274 A * | 8/1932 | Soule | ............................ | 24/600.9 |
| 3,685,660 A * | 8/1972 | Saunders | ...................... | 211/70.1 |
| 3,815,756 A * | 6/1974 | Cox | ............................... | 211/57.1 |
| 4,526,335 A * | 7/1985 | Garfinkle | ................. | 248/220.31 |
| 4,653,637 A * | 3/1987 | Wallace | ......................... | 206/372 |
| D294,530 S * | 3/1988 | Carluccio et al. | .............. | D28/73 |
| 4,871,135 A * | 10/1989 | Thalenfeld | ............... | 248/220.22 |
| 5,620,121 A * | 4/1997 | Watson | .......................... | 224/272 |
| 6,102,349 A * | 8/2000 | Hall | ......................... | 248/312.1 |
| 6,158,636 A * | 12/2000 | Latiolais | ........................ | 224/258 |
| 6,364,260 B1 * | 4/2002 | Lorincz et al. | ................ | 248/215 |
| 6,622,410 B2 * | 9/2003 | Wilkes et al. | ................... | 40/654 |
| 7,201,355 B1 * | 4/2007 | Zien et al. | ..................... | 248/301 |

FOREIGN PATENT DOCUMENTS

JP     0053936     7/1978

OTHER PUBLICATIONS

Translation of JP 53-000936.*

* cited by examiner

*Primary Examiner* — Justin Larson
*Assistant Examiner* — Peter Helvey
(74) *Attorney, Agent, or Firm* — Adams & Wilks

(57) ABSTRACT

A suspender for a brushcutter has a shoulder belt and a support member removably connected to the shoulder belt. A hook member has a link removably hooked to the support member, a hook part integrally connected to the link, a cover having a folded portion that is removably hooked on the link and a pair of projections extending from opposite sides of the folded portion, and an elastic piece having a base end part from which a fixing part extends and which is removably hung on the cover with the projections of the cover folded so that the fixing part is interposed between the folded portion and projections of the cover. A stopper member maintains the link of the hook member removably hooked to the support member.

17 Claims, 14 Drawing Sheets

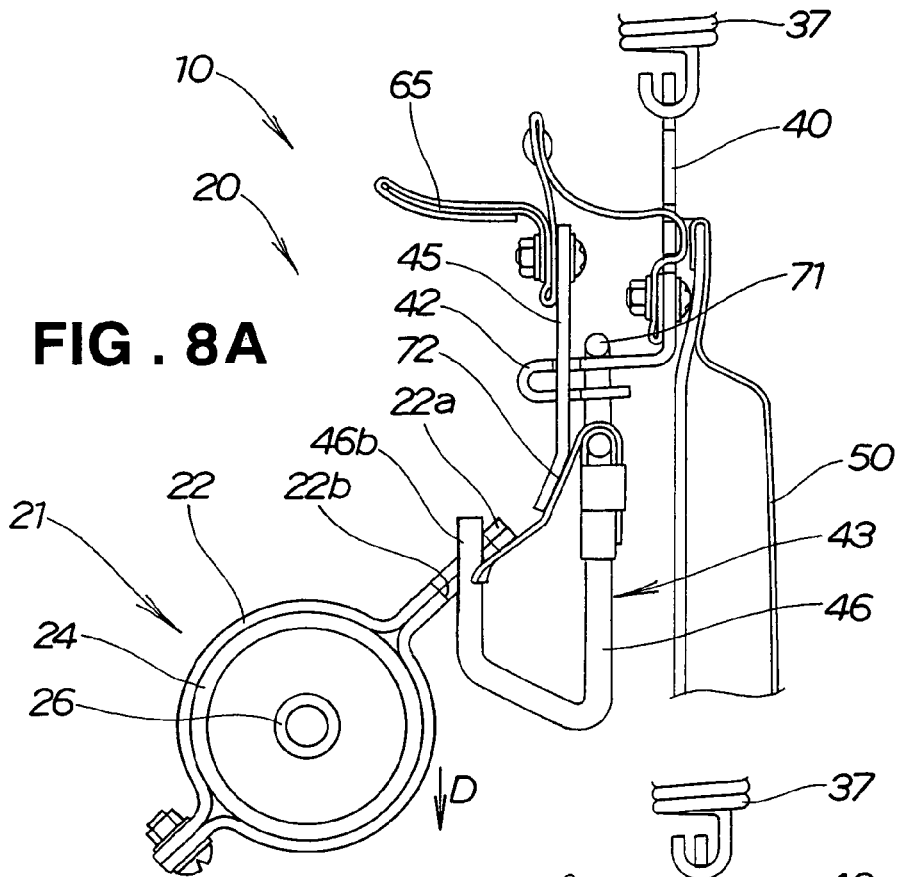
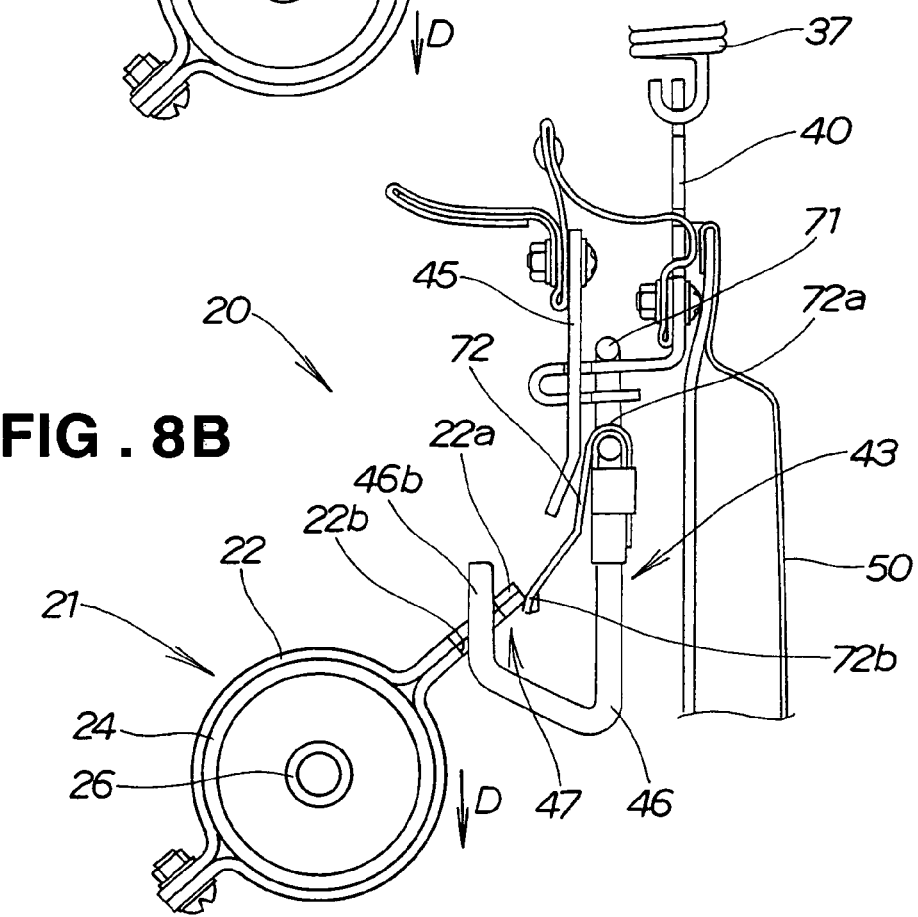

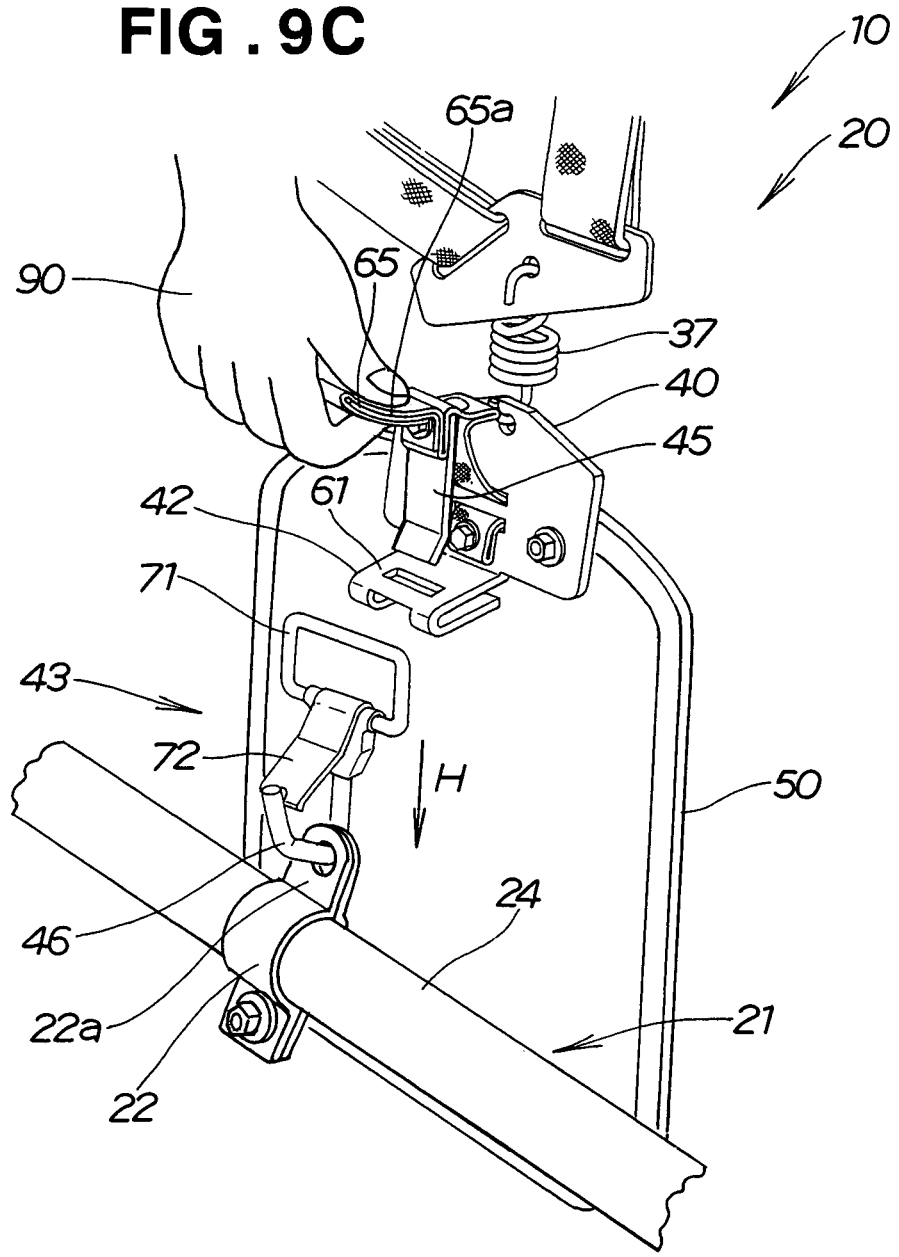

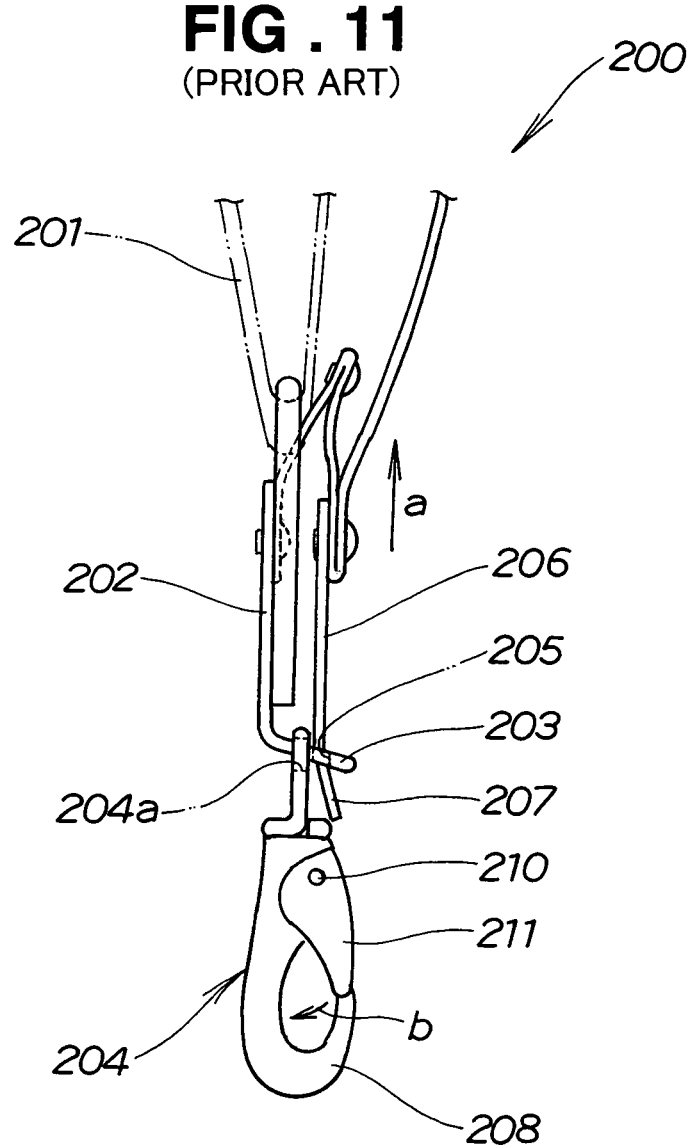

SUSPENDER FOR BRUSHCUTTER

FIELD OF THE INVENTION

The present invention relates to a suspender for suspending a brushcutter from the body of a worker while the brushcutter is being used.

BACKGROUND OF THE INVENTION

A suspender for suspending a brushcutter from the shoulder of a worker to lighten the burden on the worker when using the brushcutter to cut weeds is known for example from JP-B-53-936. The construction of this suspender will be described on the basis of FIG. 11 hereof.

A brushcutter suspender 200 shown in FIG. 11 has a construction in which a support member 202 is provided on a shoulder belt 201, a retaining part 203 is made to project from a lower end part of the support member 202 so as to slope diagonally forward and downward, the retaining part 203 fits in a retaining hole 204a of a suspending member 204, by a lower end part 207 of a stopper member 206 being inserted into an insertion hole 205 in the retaining part 203 the suspending member 204 is retained on the retaining part 203 with the stopper member 206, and a brushcutter (not shown) is hung on a hook 208 of the suspending member 204.

With this suspender 200, by the stopper member 206 being pulled up as shown by the arrow a and its lower end part 207 thereby being removed from the insertion hole 205, the suspending member 204 can be detached from the retaining part 203. By this means, during brushcutting work, when necessary, it is possible to detach the brushcutter from the suspender 200 instantaneously.

A claw part 211 is swingably supported on the suspending member 204 by way of a support pin 210. This claw part 211 is urged by the spring force of a spring member (not shown) so as to close the mouth of the hook 208. Because of this, when detaching the brushcutter from the hook 208 of the suspending member 204, first, with one hand, the claw part 211 is swung about the support pin 210 as shown by the arrow b. Swinging the claw part 211 causes the tip of the claw part 211 to move away from the tip of the hook 208, and while this state is maintained with the one hand the brushcutter is detached from the opening between the tip of the claw part 211 and the tip of the hook 208 with the other hand.

Here, the claw part 211 is relatively small and the spring force of the spring member is relatively large. The reason for this is that if the spring force of the spring member were small, it would be difficult for it to keep the claw part 211 in its closed position. Because of this, the operation of pushing the claw part 211 in the direction of the arrow b with one hand while detaching the brushcutter from the hook 208 with the other is difficult, and there has been room for improvement from the point of view of ease of manipulation. That is, a suspender with good ease of manipulation has been awaited with which it is possible to detach the brushcutter from the hook easily.

SUMMARY OF THE INVENTION

The present invention provides a brushcutter suspender including: a shoulder belt; a support member having a support plate attached to the shoulder belt and a retaining part formed on the support plate so as to project forward; a hook member that can be removably hung on the retaining part; and an insertable/removable stopper member to be inserted into the retaining part to keep the hook member hung on the retaining part, wherein the hook member has a hook part and an elastic piece that is positioned so as to face a lower end part of the stopper member inserted in the retaining part and makes the mouth of the hook part open/closable, and when the stopper member has been pushed down from a retaining position in which it keeps the hook member hung on the retaining part to a position such that the hook part is open, the elastic piece is elastically deformed with the lower end part of the stopper member and the opening of the hook part opens.

In this way, by the stopper member being pushed down, the elastic piece is pressed with the lower end part of the stopper member, the elastic piece elastically deforms, and the hook part, which had been closed, opens. The stopper member is held by the restoring spring force of the elastic piece in the state of having opened the hook part. Consequently, even when the pushing-down force is released from the stopper member, the opening of the hook part is kept in open. Thus it is possible to detach the brushcutter through the opening of the hook part easily.

Besides the function of holding the hung state of the hook member on the retaining part, the stopper member also performs the function of pressing on the elastic piece. Accordingly, it is not necessary to provide a new member for pressing the elastic piece, the number of parts can be kept down and cost can be kept down, and manipulation becomes easy.

Preferably, in a suspender according to the invention, a base end part of the elastic piece is attached to the hook member, a distal end part of the elastic piece abuts with the hook part, and of the elastic piece a downwardly sloping upper arm part extending from the base end part to the approximate middle is formed with a steeper slope than a downwardly sloping lower arm part extending from the upper arm part to the distal end part, and when the stopper member has been pushed down from the retaining position toward the open position, the upper arm part is pressed by the lower end part of the stopper member and the elastic piece elastically deforms.

By the upper arm part being formed with a steep slope like this, with the lower end part of the stopper member abutted with the upper arm part, the stopper member can be pushed downward smoothly. As a result, the upper arm part elastically deforms and the distal end part of the elastic piece moves away from the hook part and the hook part can be opened smoothly. Thus, a brushcutter hung on the hook part can be detached from the hook part easily.

BRIEF DESCRIPTION OF THE DRAWINGS

Certain preferred embodiments of the present invention will now be described in detail, by way of example only, with reference to the accompanying drawings, in which:

FIG. 8A to FIG. 8C are views showing an example of suspending a brushcutter on a hook part of a suspender proper according to the invention;

FIG. 9A to FIG. 9C are views showing an example of urgently detaching the brushcutter from the suspender by pulling up the stopper member;

FIG. 11 is a view showing a brushcutter suspender of related art.

DETAILED DESCRIPTION OF THE PREFERRED EMBODIMENTS

Figure 1:
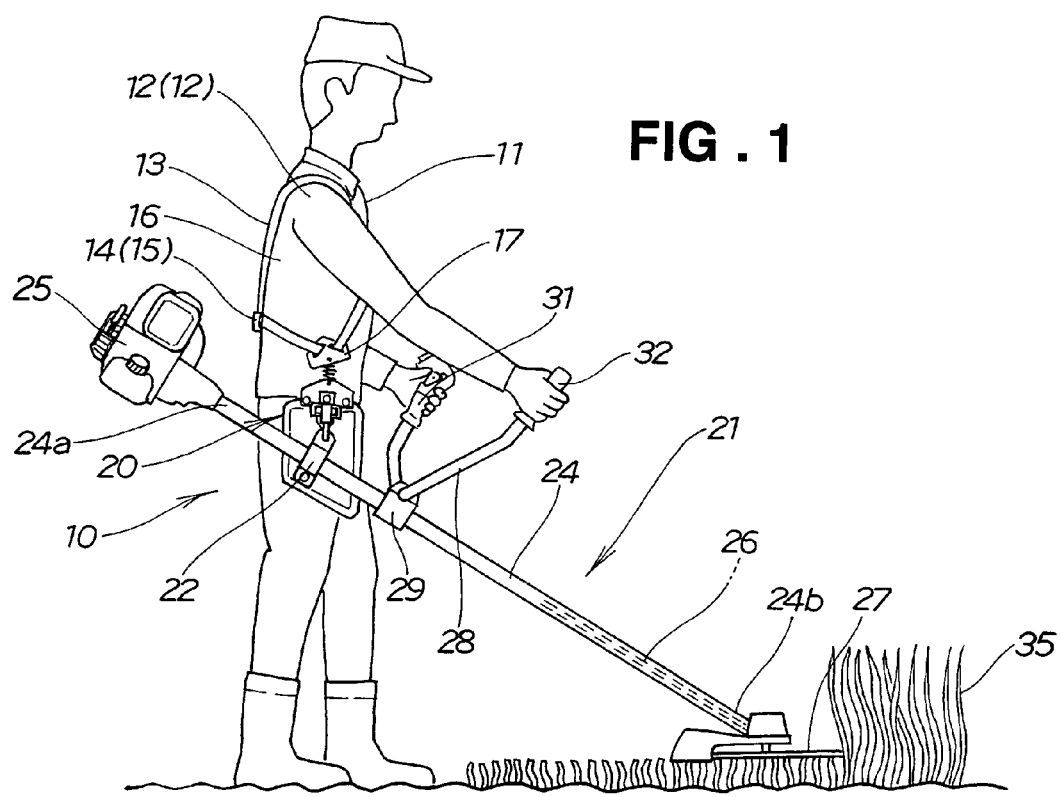
FIG. 1 is a side view showing a brushcutter suspended with a suspender according to the invention.

A suspender 10 shown in FIG. 1 has a shoulder belt 13 that can be slung on both of the shoulders 12, 12 of a worker 11. By a buckle 14 and a tongue 15 provided on a rear part of this shoulder belt 13 being fastened at the back 16 of the worker 11, the shoulder belt 13 can be attached to the upper body of the worker 11. The shoulder belt 13 has a connecting member 17, and a suspender proper 20 is attached to this connecting member 17. By an attaching member 22 (see also FIGS. 9A to 9C) of a brushcutter 21 being hooked on this suspender proper 20, the brushcutter 21 is suspended from the suspender 10.

The attaching member 22 of the brushcutter 21 is mounted in the vicinity of a base end part 24a of a control pole 24. An engine 25 is provided on the base end part 24a. Rotation of the engine 25 is transmitted by a drive shaft 26 (see also FIGS. 9A to 9C) passing through the inside of the control pole 24. The drive shaft 26 rotates a cutting blade 27. The cutting blade 27 is rotatably mounted on a distal end part 24b of the control pole 24.

A handle 28 is mounted roughly in the middle of the control pole 24 by way of a handle holder 29, so as to be approximately perpendicular to the length direction of the control pole 24 in plan view. The handle 28 is approximately U-shaped in front view and has left and right grips 31, 32.

After attaching the shoulder belt 13 to the upper body, the worker 11 hangs the brushcutter 21 by hooking the attaching member 22 of the brushcutter 21 onto the suspender proper 20 and cuts weeds 35 by rotating the cutting blade 27 with the engine 25 while gripping the left and right grips 31, 32 and swinging the control pole 24 to the left and right.

Figure 2:
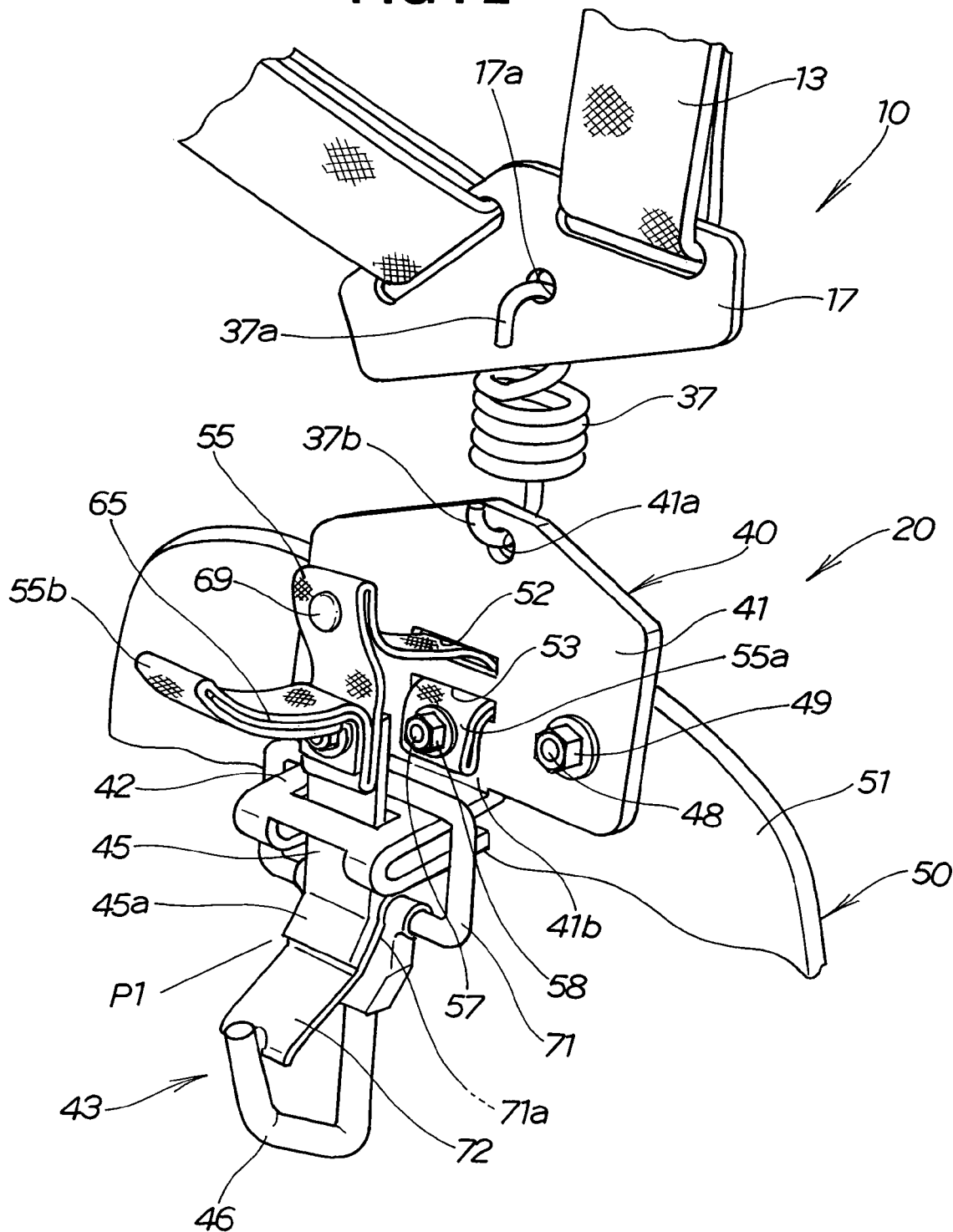
FIG. 2 is a perspective view showing a suspender proper shown in FIG. 1.

FIG. 2 shows the suspender proper 20 shown in FIG. 1 in detail in perspective view.

The suspender proper 20 has a support member 40 connected by way of a vibro-isolating spring 37 to the connecting member 17 provided on the shoulder belt 13. The support member 40 is made up of a plate part 41 and a retaining part 42. The retaining part 42 retains a hook member 43. An insertable/removable stopper member 45 is inserted as far as a retaining position P1 into the retaining part 42 with the hook member 43 hooked on it. The retaining position P1 is the position of a lower end part 45a of the stopper member 45 as of when the hook member 43 is held on the retaining part 42 by the inserted stopper member 45. The brushcutter 21 shown in FIG. 1 is hooked onto a hook part 46 of the hook member 43.

The vibro-isolating spring 37 connects the plate part 41 to the connecting member 17 by having an upper end part 37a thereof hooked through an attaching hole 17a of the connecting member 17 and a lower end part 37b hooked through an attaching hole 40a of the support member 40. This vibro-isolating spring 37 prevents vibration of the support member 40 from being transmitted to the connecting member 17.

Figure 6:
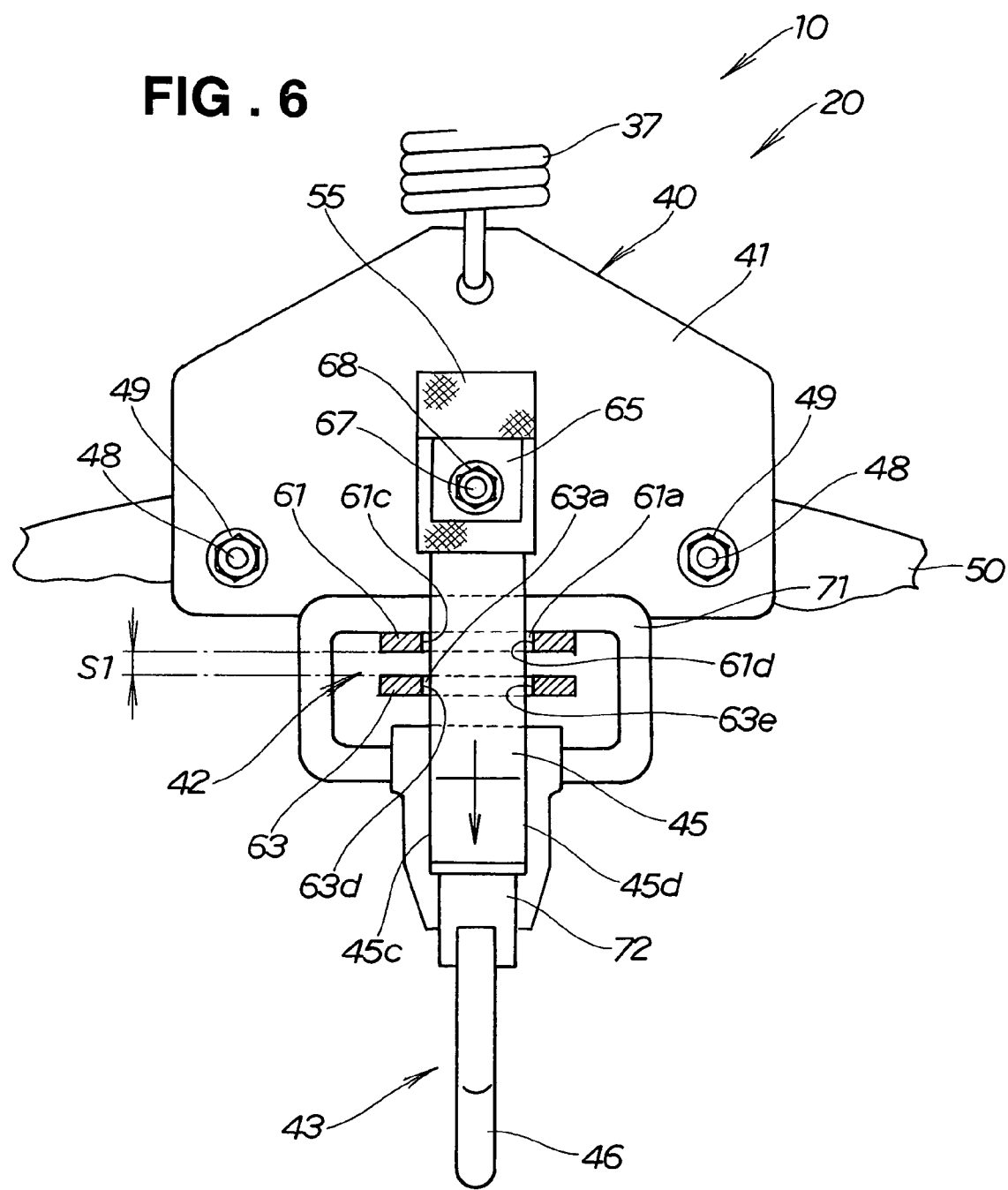
FIG. 6 is a front view of the suspender proper shown in FIG. 5.

The plate part 41 is formed in a substantially rectangular shape and is fixed to an upper end part 51 of a partition board 50 with left and right bolts and nuts 48, 49 (see FIG. 6). Upper and lower slits 52, 53 are formed parallel with each other in a central vicinity of the plate part 41. The retaining part 42 projects forward and slightly downward from a lower middle part 41b of the plate part 41.

Figure 5:
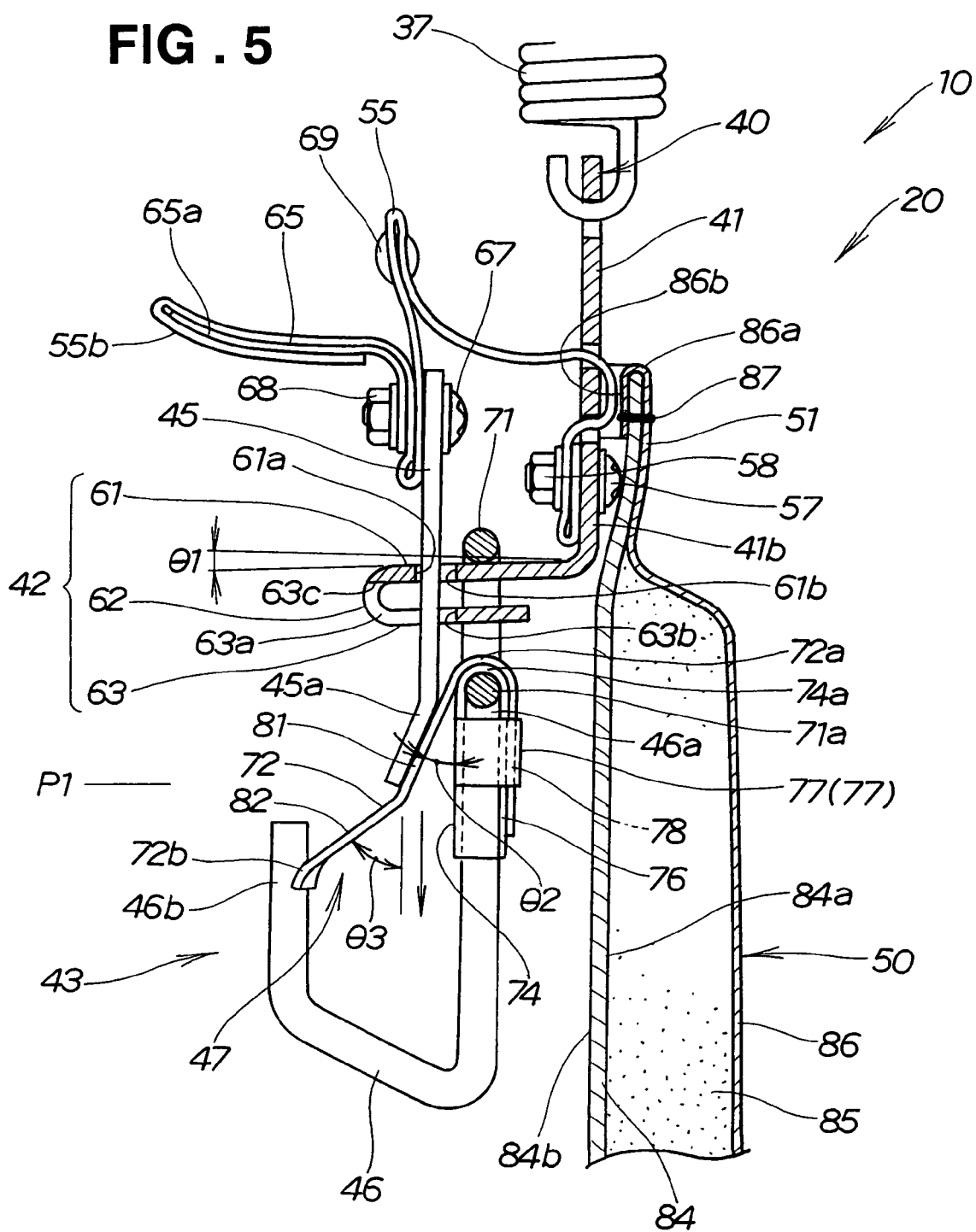
FIG. 5 is a sectional view of the suspender proper shown in FIG. 2.

An end part 55a of a strap 55 is passed through the upper and lower slits 52, 53, the end part 55a projecting through the lower slit 53 is folded double, and the part folded double is fixed to the lower middle part 41b of the plate part 41 with a bolt and a nut 57, 58 (see also FIG. 5).

The hook member 43 has a link 71 that can be retained on the retaining part 42; the hook part 46, which is provided on a lower middle part 71a of the link 71 (see FIG. 4), and an elastic piece 72 attached to the lower middle part 71a of the link 71.

The lower middle part 71a of the link 71 is a portion that faces the lower end part 45a of the stopper member 45 when the stopper member 45 has been passed through the retaining part 42.

The hook member 43 will be described in detail with reference to FIG. 4.

Figure 3:
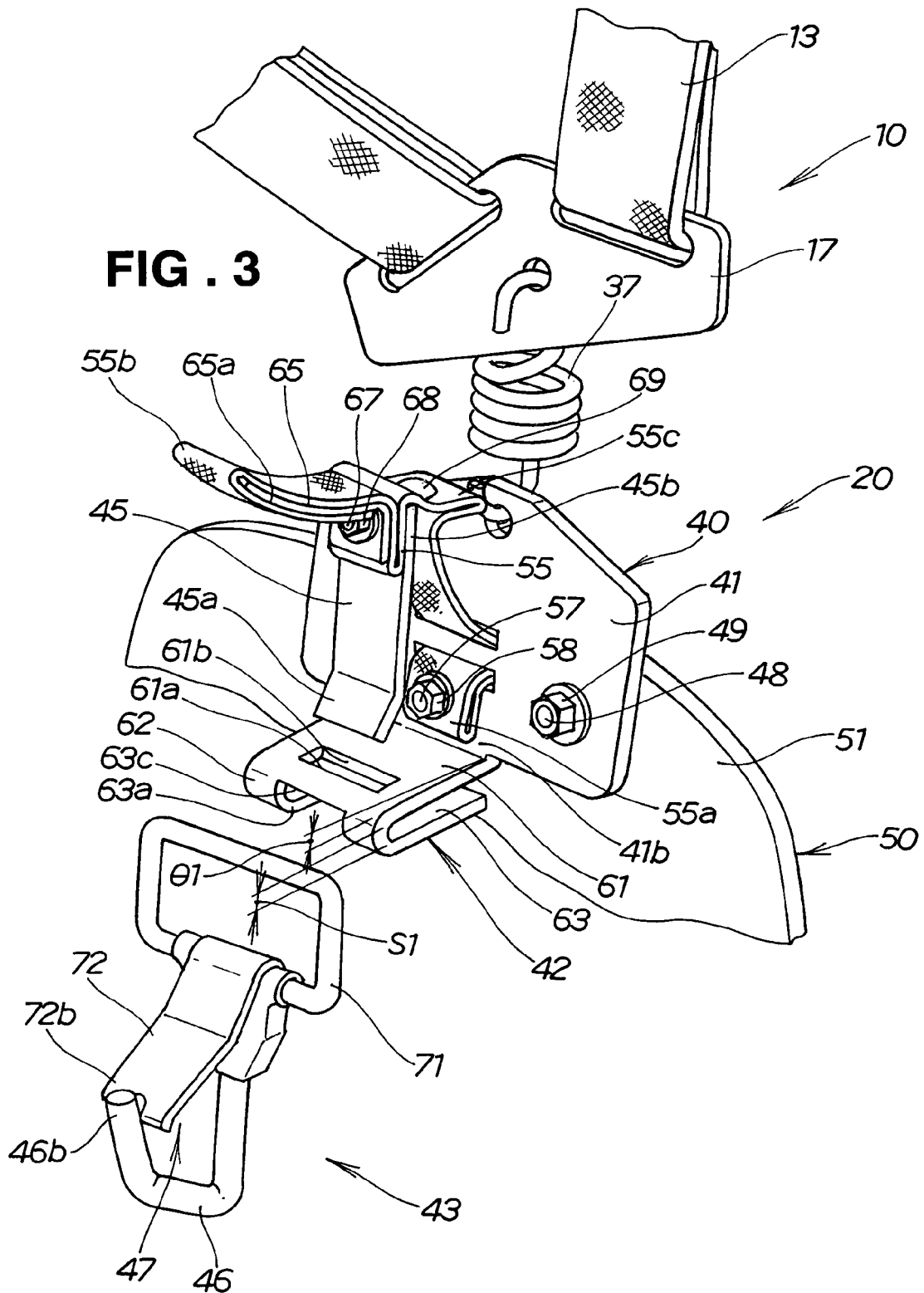
FIG. 3 is a perspective view showing a hook member removed from its position in FIG. 2.

FIG. 3 shows the hook member 43 separated from the retaining part 42, in the brushcutter suspender.

The retaining part 42 is made up of an upper projection 61 and a lower projection 63, folded at a bent part 62 to face each other. The upper projection 61 projects from the lower middle part 41b of the plate part 41 at a downward slope of angle θ1 (see also FIG. 5) toward its distal end. The lower projection 63 is folded back at the bent part 62 at the distal end of the upper projection 61 so as to be parallel with the upper projection 61, and has a predetermined spacing S1 with respect to the upper projection 61.

An insertion hole 61a is formed in the upper projection 61 in the proximity of the bent part 62. A cutaway 63a is formed to extend from the bent part 62 toward the insertion hole 61a.

Of the ends 63b, 63c (see FIG. 5) of the cutaway 63a, the end 63b nearer the plate part 41 and the corresponding end 61b of the insertion hole 61a are in approximately the same plane (see FIG. 5). The stopper member 45 is insertable through the insertion hole 61a and the cutaway 63a.

The stopper member 45 is for example a metal plate in the shape of a tongue extending in the vertical direction. The plate thickness and width of the stopper member 45 are set so that it can be inserted through the insertion hole 61a and the cutaway 63a. The lower end part 45a of this stopper member 45 slopes away from the plate part 41 with progress downward. The strap 55 and an operating plate 65 are attached to an upper end part 45b of the stopper member 45 with a bolt and a nut 67, 68.

A base end part of the operating plate 65 bent in a crook shape is attached to the upper end part 45b of the tongue-shaped stopper member 45 with the bolt and nut 67, 68. An operating arm 65a of the operating plate 65 projects away from the plate part 41 diagonally upward from the top end of the base end part. The strap 55 is sandwiched in a folded-double state between the base end part of the operating plate 65 and the stopper member 45.

A portion 55b extending from one side of the folded-double strap 55 is affixed with adhesive to the upper face and the lower face of the end part 65a. By this means, the upper face and the lower face of the operating arm 65a are covered with the portion 55b of the strap 55. A portion 55c extending from the other side of the folded-double strap 55 is folded double part-way along it and riveted, and the end part 55a is inserted through the upper and lower slits 52, 53.

The end part 55a projecting from the lower slit 53 is folded double and fixed to the lower middle part 41b of the plate part 41 with the bolt and nut 57, 58 (see also FIG. 5). By this means the operating plate 65 and the stopper member 45 are connected to the support member 40 by the strap 55.

Gripping the operating arm 65a of the operating plate 65 with fingers and lifting the stopper member 45 and pulling it out of the insertion hole 61a and the cutaway 63a makes it possible to detach the link 71 of the hook member 43 from the retaining part 42.

Because the stopper member 45 and the operating plate 65 are connected to the plate part 41 by the strap 55, there is no risk of the stopper member 45 and the operating plate 65 getting lost when the stopper member 45 is pulled out of the insertion hole 61a and the cutaway 63a.

Figure 4:
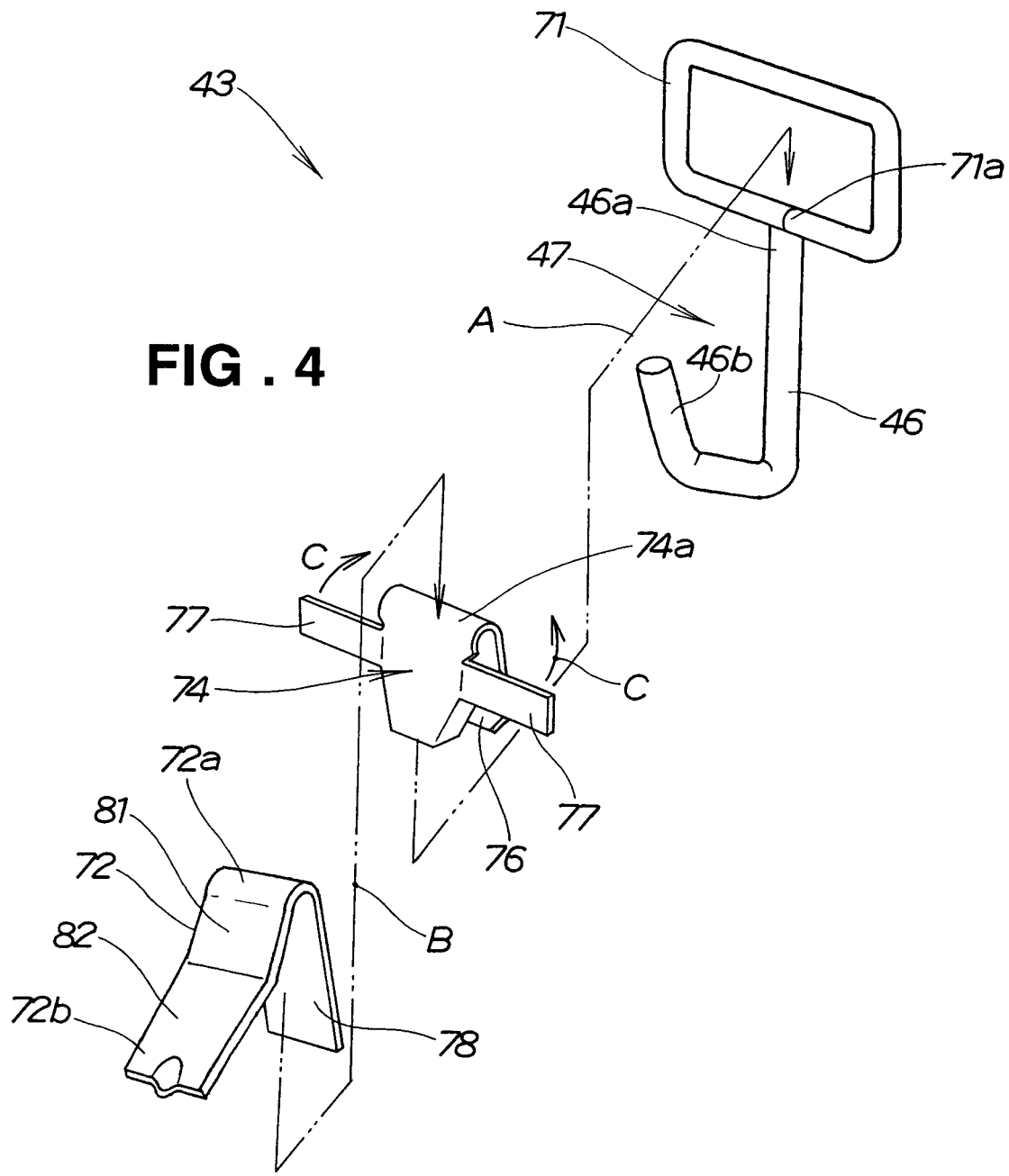
FIG. 4 is an exploded perspective view of the hook member shown in FIG. 3.

FIG. 4 shows the hook member 43 shown in FIG. 3.

The link 71 of the hook member 43 is a frame formed in an approximately rectangular shape by bending a rod. The hook part 46 is formed in an approximate J shape by bending a rod.

A base end part 46a of the hook part 46 is fixed by welding to the lower middle part 71a of the link 71. By a folded portion 76 of a cover 74 being hooked on the lower middle part 71a of the link 71 as shown by the arrow A, the lower middle part 71a of the link 71 and the base end part 46a of the hook part 46 are covered by the cover 74.

A base end part 72a of the elastic piece 72 is hung on an upper end part (top bend part) 74a of the cover 74 as shown by the arrow B. By projections 77, 77 on opposite sides of the cover 74 being folded as shown by the arrow C, a fixing piece 78 of the elastic piece 72 is covered. By this means, the fixing piece 78 is sandwiched by the folded portion 76 of the cover 74 and the projections 77, 77 at the sides (see also FIG. 5).

In this state, the lower middle part 71a of the link 71 and the base end part 46a of the hook part 46 are covered with the cover 74.

The base end part 72a of the elastic piece 72 is positioned at the bend part 74a of the cover 74, and a distal end part 72b of the elastic piece 72 abuts with a distal end part 46b of the hook part 46 (see FIG. 3 and FIG. 5). By this means, the opening 47 of the hook part 46 is kept in a state wherein it is closed by the elastic piece 72 (see FIG. 3 and FIG. 5).

FIG. 5 shows a sectional view of a suspender proper 20 according to the invention.

An upper arm part 81 of the elastic piece 72 extends from the upper end part 74a of the cover 74 toward the distal end part 46b of the hook part 46 at a downward slope of slant angle θ2 as far as part-way across the opening 47. A lower arm part 82 of the elastic piece 72 extends from the end of the upper arm part 81 toward the distal end part 46b of the hook part 46 at a downward slope of slant angle θ3. The distal end part 72b of the elastic piece 72 abuts with the distal end part 46b of the hook part 46. By this means, the opening 47 of the hook part 46 is kept in a closed state by the upper arm part 81 and the lower arm part 82 of the elastic piece 72.

The slant angle θ2 of the upper arm part 81 is made smaller than the slant angle θ3 of the lower arm part 82. That is, by the downwardly sloping upper arm part 81 extending from the base end part 72a of the elastic piece 72 as far as a central vicinity being given a steeper slope than the downwardly sloping lower arm part 82 extending from the upper arm part 81 to the distal end part 72b, the upper arm part 81 and the lower arm part 82 are formed in a dog-leg shape.

When the stopper member 45 is inserted through the insertion hole 61a and the cutaway 63a of the retaining part 42, the lower end part 45a of the stopper member 45 abuts with the upper arm part 81 of the elastic piece 72.

The reason for the upper arm part 81 being given a steeper slope than the lower arm part 82 will be discussed later.

By the upper end part 51 of the partition board 50 being fixed to the plate part 41 with two sets of bolts and nuts 48, 49 (see FIG. 6), the head of the bolt 57 is covered with the upper end part 51 of the partition board 50.

The partition board 50 has a construction in which, of the two sides of a board proper 84 made of resin, a sponge 85 is disposed on a rear side 84a on the opposite side from a front side 84b facing the support member 40; this sponge 85 is covered with a piece of cloth 86; a peripheral part 86a of the piece of cloth 86 is folded back onto the front side 84b at the periphery of the board proper 84; and the folded-back portion 86b is stitched with stitching thread 87 along the periphery of the board proper 84.

By the piece of cloth 86 side of the partition board 50 contacting with the worker 11 (see FIG. 1), the pressing force and the vibration during operation of the brushcutter 21 are absorbed by the sponge 85.

FIG. 6 shows the suspender proper 20 in front view.

The upper projection 61 and the lower projection 63 of the retaining part 42 are disposed in parallel so as to have a predetermined spacing S1. The stopper member 45 is inserted through the insertion hole 61a of the upper projection 61 and the cutaway 63a of the lower projection 63.

The left side 45c of the stopper member 45 is confined by two faces, the left face 61c of the insertion hole 61a formed in the upper projection 61 and the left face 63d of the cutaway 63a formed in the lower projection 63, and the right side 45d of the stopper member 45 is confined by the two faces, the right face 61d of the insertion hole 61a and the right face 63e of the cutaway 63a. Accordingly, the stopper member 45 can be pushed down smoothly in the direction of the arrow.

Figure 7:
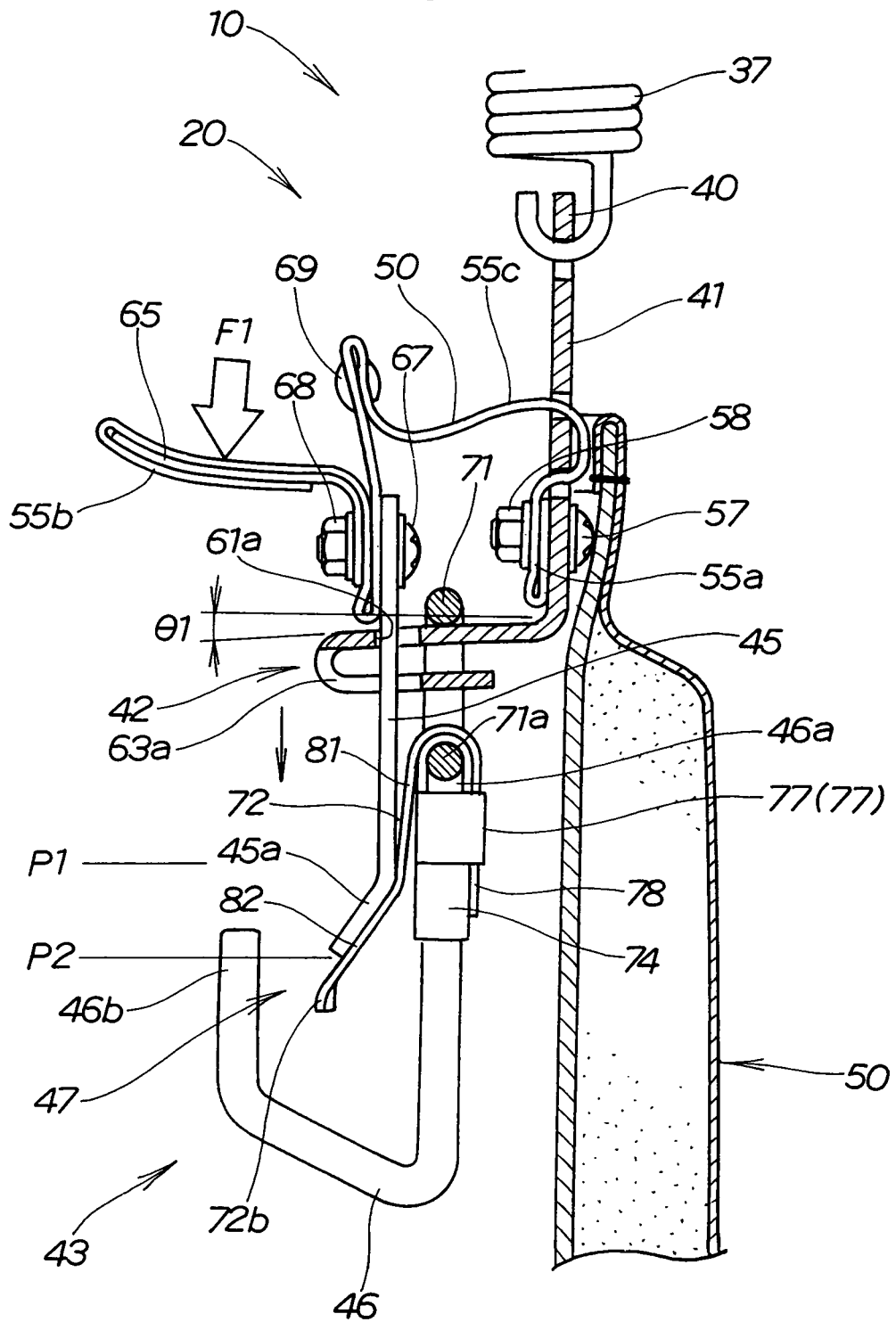
FIG. 7 is a sectional view showing, in the suspender proper shown in FIG. 5, a stopper member pushed down to open a hook part.

FIG. 7 shows the stopper member 45 having been pushed down and opened the hook member 43.

The operating plate 65 is pressed from above with a thumb 91 (see FIG. 10B), and a pushing-down force F1 is thereby applied to the operating plate 65. By this pushing-down force F1, the stopper member 45 is pushed down against the spring force of the elastic piece 72 from the retaining position P1 (see also FIG. 2 and FIG. 5) as far as an opening position P2 as shown with an arrow. By the stopper member 45 being pushed down to the opening position P2, the elastic piece 72 (and particularly the upper arm part 81) is pushed downward by the lower end part 45a of the stopper member 45 and opens the opening 47 of the hook part 46.

Here, the reason for the upper arm part 81 being given a steeper slope than the lower arm part 82 will be explained, on the basis of FIG. 5.

The elastic piece 72 is a member capable of opening and closing the opening 47 of the hook part 46, and for example a plate spring is used.

The upper arm part 81 of the elastic piece 72 is formed so as to slant with a steeper slope than the lower arm part 82. Because of this, when with the lower end part 45a of the stopper member 45 positioned in the retaining position P1 a pushing-down force F1 is applied to the operating plate 65, the lower end part 45a of the stopper member 45 can be made to slide on the upper face of the upper arm part 81 and pushed down smoothly along the cover 74 as shown with an arrow. Consequently, the elastic piece 72 elastically deforms counterclockwise about its base end part 72a.

By the elastic deformation of the elastic piece 72, as shown in FIG. 7, the distal end part 72b of the elastic piece 72 (specifically, the distal end part of the lower arm part 82) moves away from the distal end part 46b of the hook part 46. A gap opens up between the distal end part 46b of the hook part 46 and the distal end part 72b of the elastic piece 72, and the opening 47 of the hook part 46 opens.

In this way, by giving the upper arm part 81 a steeper slope than the lower arm part 82, the opening 47 of the hook part 46 can be opened smoothly.

Here, the slant angle θ2 of the upper arm part 81 shown in FIG. 5 is preferably set in the range of 15 to 25°.

When the slant angle θ2 is less than 15°, the angle of the bend between the upper arm part 81 and the lower arm part 82 is too large, and when the stopper member 45 is pushed down it is difficult for the lower end part 45a of the stopper member 45 to move from the upper arm part 81 to the lower arm part 82 and it is difficult to open the opening 47 of the hook part 46 smoothly.

When on the other hand the slant angle θ2 is greater than 25°, the slant of the upper arm part 81 is too gentle, and when the stopper member 45 is pushed down the lower end part 45a of the stopper member 45 slips along the upper arm part 81 away from the cover 74, the upper arm part 81 tends not to elastically deform, and it is difficult to open the opening 47 of the hook part 46 smoothly.

Accordingly, the slant angle θ2 of the upper arm part 81 is set in the range of 15 to 25° so that the opening 47 of the hook part 46 can be opened smoothly with the stopper member 45.

As described above, in the suspender proper 20, a stopper member 45 is provided as a member for retaining a hook member 43 on a retaining part 42, and this stopper member 45 is made to double as a member for pressing an elastic piece 72. Therefore, it is not necessary to provide a new member for pressing the elastic piece 72. By this means it is possible to press the elastic piece 72 with a simple construction and the number of parts can be minimized.

Next, it will be explained how a brushcutter suspender proper 20 is used.

First, an example of suspending a brushcutter 21 from a suspender proper 20 will be described, on the basis of FIG. 8A to FIG. 8C.

As shown in FIG. 8A, the distal end part 46b of the hook part 46 is inserted into a hanging hole 22b formed in a projection 22a of the attaching member 22. The brushcutter 21 drops down under its own weight as shown by the arrow D.

In FIG. 8B, as a result of the brushcutter 21 dropping as shown by the arrow D, the projection 22a drops. By the projection 22a dropping, the distal end part 72b of the elastic piece 72 is pushed downward. The elastic piece 72 elastically deforms counterclockwise about its base end part 72a. As a result of the elastic piece 72 elastically deforming, the distal end part 72b of the elastic piece 72 moves away from the distal end part 46b of the hook part 46, and the opening 47 of the hook part 46 opens.

Figure 8C:
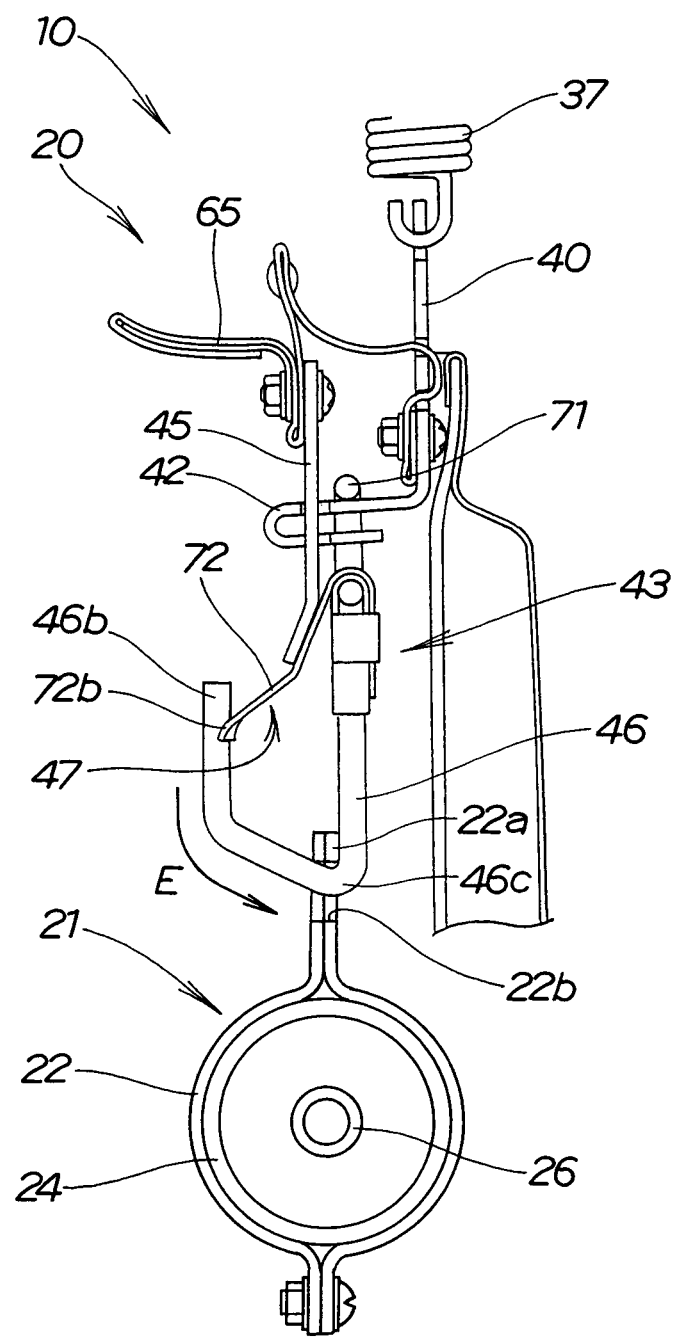

As shown in FIG. 8C, the projection 22a passes through the opening 47 of the hook part 46 and the hanging hole 22b slides down along the hook part 46 to a bottom part 46c as shown by the arrow E. By this means, the attaching member 22 is hung on the hook part 46.

After the projection 22a passes through the opening 47 of the hook part 46, the elastically deformed elastic piece 72 returns to its original position under its spring force. The distal end part 72b of the elastic piece 72 abuts with the distal end part 46b of the hook part 46, and the opening 47 of the hook part 46 closes. The projection 22a of the attaching member 22 is thereby prevented from coming out through the opening 47 of the hook part 46.

By this means, the attaching member 22 is locked so that it does not come off the hook part 46, and the brushcutter 21 can be hung securely.

Next, an example of removing the brushcutter 21 from the suspender proper 20 urgently will be described, on the basis of FIG. 9A to FIG. 9C.

Figure 9A:
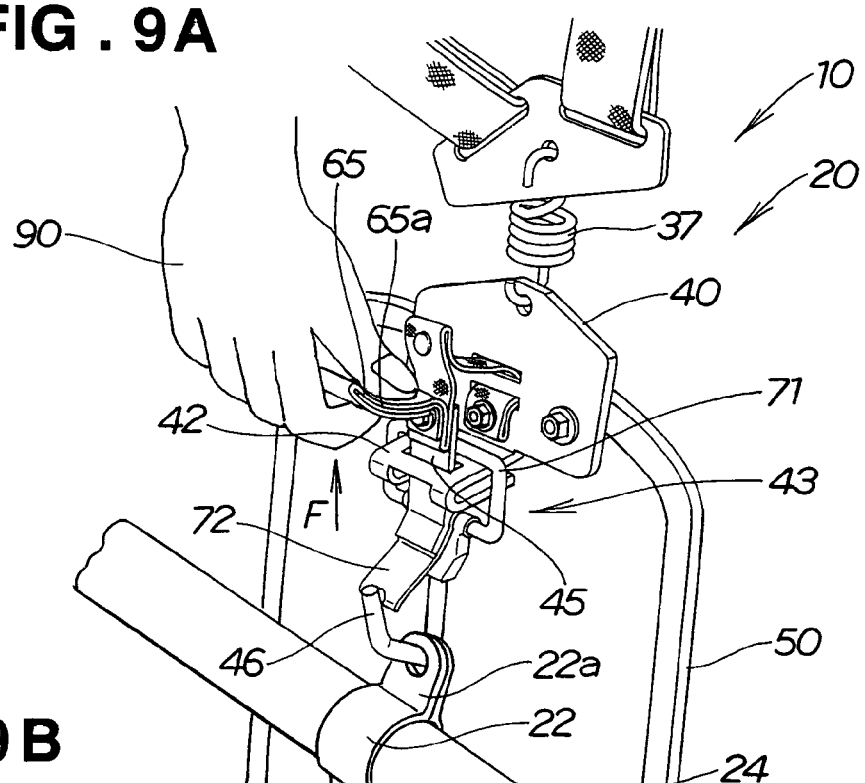

In FIG. 9A, the operating arm 65a of the operating plate 65 is gripped with a hand 90 and the operating plate 65 is pulled up. The stopper member 45 is pulled up together with the operating plate 65 as shown by the arrow F.

Figure 9B:
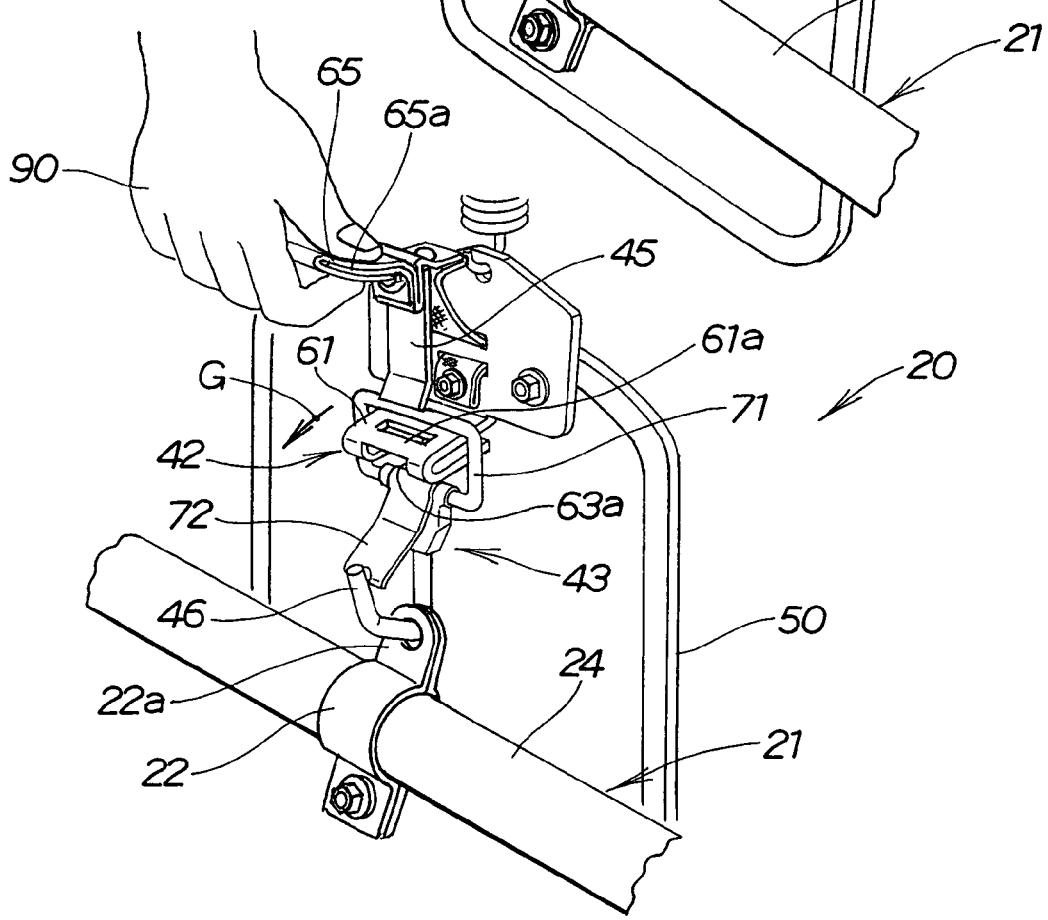

As shown in FIG. 9B, the stopper member 45 is pulled out from the insertion hole 61a and the cutaway 63a. The link 71 of the hook member 43 slides over the surface of the upper projection 61 of the retaining part 42 under the weight of the brushcutter 21 as shown by the arrow G and detaches from the retaining part 42.

Here, because the upper projection 61 of the retaining part 42 has been made to project toward its distal end with a downward slope of angle θ1 (see FIG. 3), the link 71 of the hook member 43 detaches from the upper projection 61 of the retaining part 42 smoothly under the weight of the brushcutter 21.

As shown in FIG. 9C, when the link 71 of the hook member 43 detaches from the retaining part 42, the brushcutter 21 drops under its own weight as shown by the arrow H.

As described above, it is possible to detach a brushcutter 21 connected to the hook member 43 from the suspender proper 20 instantaneously just by pulling up the stopper member 45.

Figure 10A:
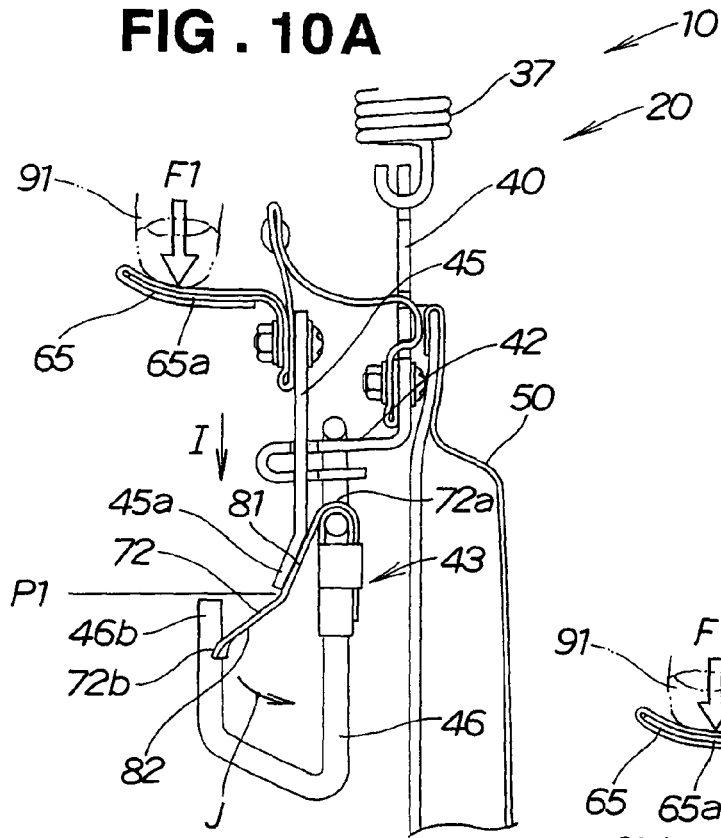
FIG. 10A to FIG. 10C are views showing an example of detaching the brushcutter from the hook member of the suspender proper by pushing down the stopper member.

Next, an example of removing a brushcutter 21 hanging from the suspender proper 20 normally will be described, on the basis of FIG. 10A to FIG. 10C.

As shown in FIG. 1A, the operating arm 65a of the operating plate 65 is pushed from above with a thumb 91 and a pushing-down force F1 is thereby applied to the operating plate 65. With this pushing-down force F1, the stopper member 45 is pushed down against the spring force of the elastic piece 72 from the retaining position P1 as shown by the arrow I.

Here, as a result of the upper arm part 81 of the elastic piece 72 being given a steeper slope than the lower arm part 82, the lower end part 45a of the stopper member 45 slides on the upper arm part 81 and descends smoothly.

When the lower end part 45a of the stopper member 45 descends, the elastic piece 72 elastically deforms counterclockwise about the base end part 72a as shown by the arrow J and the distal end part 72b of the elastic piece 72 moves away from the distal end part 46b of the hook part 46.

Figure 10B:
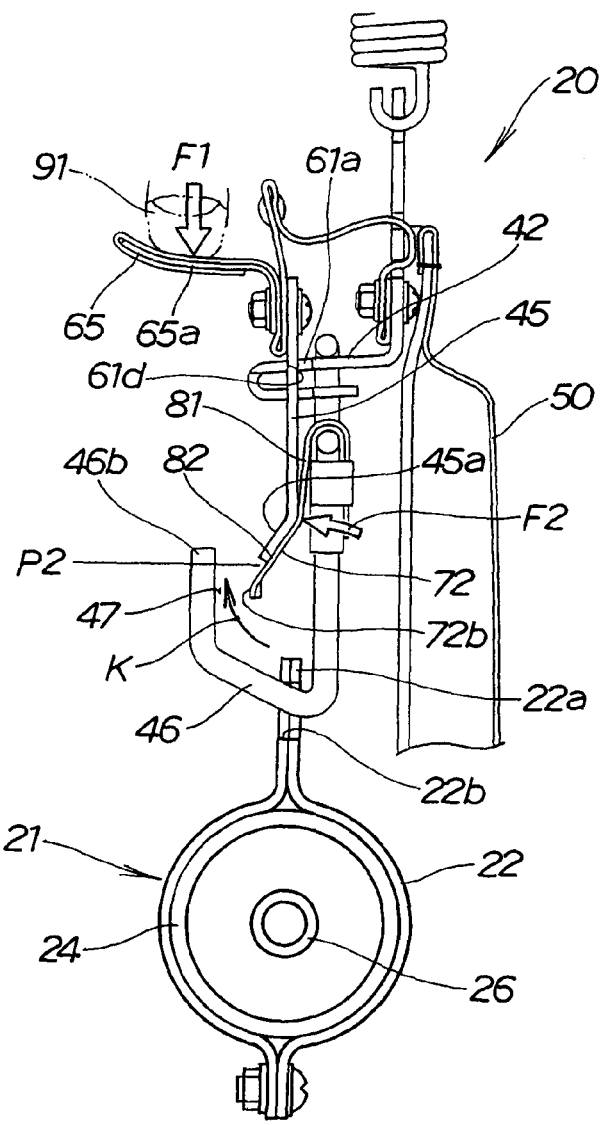

As shown in FIG. 10B, the stopper member 45 is pushed down as far as the opening position P2. The lower end part 45a of the stopper member 45 elastically deforms the elastic piece 72 to the position shown in the figure, and opens the opening 47 of the hook part 46 to a predetermined size.

In this state, a spring force F2 tending to restore the elastic piece 72 to its original position acts on the lower end part 45a of the stopper member 45. Consequently, the stopper member 45 is pushed forward by the spring force F2 and makes contact with the end 61e of the insertion hole 61a, and by the frictional force of this contact it is held in the opening position P2 and does not return upward. Therefore, even when the pushing-down force F1 is removed from the stopper member 45, the opening 47 of the hook part 46 remains open.

With the opening 47 opened to a predetermined size, the brushcutter 21 is lifted up and the projection 22a of the attaching member 22 is moved toward the distal end part 46b of the hook part 46.

Figure 10C:
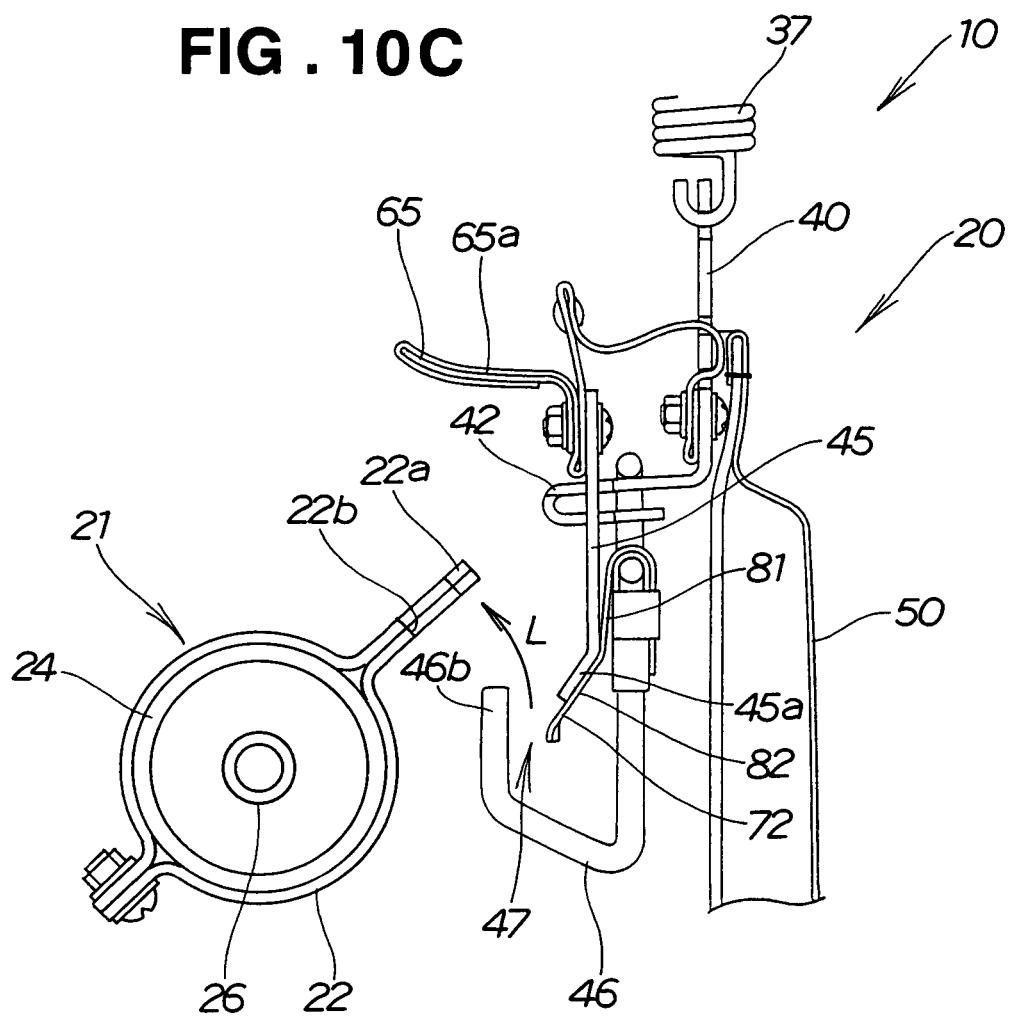

As shown in FIG. 10C, after the projection 22a of the attaching member 22 has passed through the opening 47, the projection 22a is detached from the distal end part 46b of the hook part 46 as shown by the arrow L.

As described above, the opening 47 of the hook part 46 can be opened just by pushing down the stopper member 45 to the opening position P2 with the operating plate 65, and, furthermore, the opened state of the opening 47 of the hook part 46 can be maintained even when the pushing-down force F1 (see FIGS. 10A and 10B) is removed from the stopper member 45. By this means, it is possible to detach the brushcutter 21 from the opening 47 of the hook part 46 easily.

Although in the foregoing preferred embodiment an example was described in which the stopper member 45 consisted of a tongue-shaped metal plate, the invention is not limited to this, and alternatively it can consist of some other member such as a metal rod.

And whereas in the foregoing preferred embodiment an example was described in which the lower end part 45a of the stopper member 45 was made to slant, alternatively the lower end part 45a can be not made to slant and formed in a vertical shape, and when it is made to slant the angle of that slant can be selected freely.

Also, although in the foregoing preferred embodiment an example was described in which the upper end part 51 of the partition board 50 is fixed to the plate part 41 of the support member 40 with bolts and nuts 48, 49, it is also possible to use some other fastening members such as rivets.

And although in the foregoing preferred embodiment an example was described in which a folded-double part of the strap 55 is fixed to the plate part 41 with a bolt and a nut 57, 58, it is also possible to use some other fastening member such as a rivet.

Also, whereas in the foregoing preferred embodiment an example was described in which the strap 55 and the operating plate 65 are fixed to the stopper member 45 with a bolt and a nut 67, 68, it is also possible to use some other fastening member such as a rivet.

Obviously, various minor changes and modifications of the present invention are possible in the light of the above teaching. It is therefore to be understood that within the scope of the appended claims the invention may be practiced otherwise than as specifically described.

What is claimed is:

1. A suspender for a brushcutter, the suspender comprising:
    a shoulder belt;
    a support member having a plate part attached to the shoulder belt and a retaining part formed on the plate part so as to project forward, the retaining part having an upper projection, a lower projection folded at a bent part so as to confront one another, an insertion hole formed in the upper projection in the proximity of the bent part, and a cutaway formed to extend from the bent part toward the insertion hole;
    a hook member comprising a link removably retained on the retaining part of the support member, a hook part having a base end portion provided on a lower middle part of the link, a cover having a folded portion hooked on the lower middle part of the link so that the lower middle part of the link and the base end portion of the hook part are covered by the cover, and an elastic piece having a base end part hung on an upper end part of the cover, the cover having projections disposed on opposite sides thereof and being folded to cover a fixing part of the elastic piece so that the fixing part is interposed between the folded portion and projections of the cover with the fixing part, projections and folded portion being parallel to one another, and the base end part of the elastic piece being positioned at the upper end part of the cover and a distal end part of the elastic piece abutting with a distal end part of the hook part so that an opening of the hook part is maintained in a state in which the opening is closed by the elastic piece; and
    an insertable/removable stopper member that is insertable through the insertion hole and the cutaway of the retaining part of the support member to keep the link of the hook member retained on the retaining part;
    wherein the elastic piece of the hook member is positioned relative to the hook part of the hook member so that when the stopper member is inserted through the insertion hole and the cutaway of the retaining part of the support member, the elastic piece confronts a lower end part of the stopper member for making the opening of the hook part open/closable, and when the stopper member is pushed downward from a retaining position in which the stopper member keeps the hook member upon the retaining part to an opening position in which the hook part is open, the elastic piece is elastically deformed by the lower end part of the stopper member and the opening of the hook part opens.

2. A suspender according to claim 1; wherein the elastic piece has a distal end part that abuts with the hook part, a downwardly sloping upper arm part extending from the base end part to an approximate center between the base end part and the distal end part, and a downwardly sloping lower arm part extending from the upper arm part to the distal end part; and wherein the downwardly sloping upper arm part is formed with a steeper slope than the downwardly sloping lower arm part so that when the stopper member is pushed downward from the retaining position toward the opening position, the upper arm part is pressed and elastically deformed by the lower end part of the stopper member.

3. A suspender according to claim 1; wherein the elastic piece has a fixing part extending from the base end part for removable connection to the hook member, a distal end part that abuts with the hook part, a downwardly sloping upper arm part extending from the base end part to an approximate center between the base end part and the distal end part, and a downwardly sloping lower arm part extending from the upper arm part to the distal end part.

4. A suspender according to claim 1; wherein the upper and lower projections of the retaining part are disposed in parallel and in spaced-apart relation to one another.

5. A suspender according to claim 1; wherein the elastic piece has a distal end part that abuts with the hook part, a downwardly sloping upper arm part extending from the base end part to an approximate center between the base end part and the distal end part, and a downwardly sloping lower arm part extending from the upper arm part to the distal end part, the upper arm part being formed with a steeper slope than the downwardly sloping lower arm part.

6. A suspender according to claim 5; wherein the upper arm part has a slant angle in the range of 15° to 25°.

7. A suspender according to claim 1; wherein the elastic piece of the hook member has a structure separate and independent from the hook part of the hook member.

8. A suspender for a brushcutter, the suspender comprising:
    a shoulder belt;
    a support member removably connected to the shoulder belt;
    a hook member having a link removably hooked to the support member, a hook part integrally connected to the link, a cover having a folded portion that is removably hooked on the link and a pair of projections extending from opposite sides of the folded portion, and an elastic piece having a base end part from which a fixing part extends and which is removably hung on the cover with the projections of the cover folded so that the fixing part is interposed between the folded portion and projections of the cover with the folded portion, projections and fixing part being disposed parallel to one another;

a stopper member that maintains the link of the hook member removably hooked to the support member;

wherein the support member has a plate part attached to the shoulder belt and a retaining part projecting from the plate part and to which the link of the hook member is removably hooked;

wherein the retaining part of the support member has an upper projection, a lower projection folded at a bent part so as to confront one another, an insertion hole formed in the upper projection in the proximity of the bent part, and a cutaway formed to extend from the bent part toward the insertion hole; and wherein the stopper member is insertable through the insertion hole and the cutaway of the retaining part to maintain the link of the hook member removably hooked to the retaining part.

9. A suspender according to claim 8; wherein the hook part has a base end portion fixed to a portion of the link; and wherein the folded portion of the cover is hooked on the portion of the link so that the portion of the link and the base end portion of the hook part are covered by the cover.

10. A suspender according to claim 8; wherein the elastic piece has a distal end part that abuts with the hook part, a downwardly sloping upper arm part extending from the base end part to an approximate center between the base end part and the distal end part, and a downwardly sloping lower arm part extending from the upper arm part to the distal end part, the upper arm part being formed with a steeper slope than the downwardly sloping lower arm part.

11. A suspender according to claim 10; wherein the upper arm part has a slant angle in the range of 15° to 25°.

12. A suspender according to claim 8; wherein the elastic, piece is positioned relative to the hook part so that when the stopper member is inserted through the insertion hole and the cutaway of the retaining part, a distal end part of the elastic piece confronts a lower end part of the stopper member for making an opening of the hook part open/closable; and wherein when the stopper member is pushed downward from a retaining position in which the stopper member keeps the link of the hook member on the retaining part to an opening position in which the hook part is open, the elastic piece is elastically deformed by the lower end part of the stopper member and the opening of the hook part opens.

13. A suspender according to claim 8; wherein the hook part and the elastic piece of the hook member are separate and independent in structure.

14. A suspender for a brushcutter, the suspender comprising:

a shoulder belt;

a support member having a plate part removably attached to the shoulder belt and a retaining part projecting from the plate part;

a hook member that is removably hooked upon the retaining part of the support member, the hook member having a hook part and an elastic piece removably connected to the hook part, the elastic piece having a base end part attached to the hook member, a distal end part that abuts with the hook part, a downwardly sloping upper arm part extending from the base end part to an approximate center between the base end part and the distal end part, and a downwardly sloping lower arm part extending from the upper arm part to the distal end part; and a stopper member that is inserted into the retaining part of the support member to keep the hook member hooked on the retaining part, the distal end part of the elastic piece being positioned relative to the hook part so that when the stopper member is inserted into the retaining part of the support member, the upper arm part of the elastic piece confronts a lower end part of the stopper member for making an opening of the hook part open/closable, the stopper member being movable from a retaining position in which the stopper member keeps the hook member hooked on the retaining part to an opening position in which the opening of the hook part is open, and the upper arm part of the elastic piece being formed with a steeper slope than the lower arm part of the elastic piece and having a slant angle in the range of 15° to 25° so that when the stopper member is moved downward from the retaining position toward the opening position, the upper arm part is pressed and elastically deformed by the lower end part of the stopper member to open the opening of the hook part;

wherein the hook member has a link that is integrally connected to a base end portion of the hook part and that is removably hooked upon the retaining part of the support member, and a cover having a folded portion that is removably hooked on the link and a pair of projections extending from opposite sides of the folded portion;

wherein the base end part of the elastic piece is removably hung on an upper end part of the cover and the projections of the cover are folded so that a fixing part of the elastic piece is interposed between the folded portion and projections of the cover with the folded portion, projections and fixing part being disposed parallel to one another;

wherein the base end portion of the hook part is fixed to a lower middle part of the link; and wherein the folded portion of the cover is hooked on the lower middle part of the link so that the lower middle part of the link and the base end part of the hook part are covered by the cover.

15. A suspender according to claim 1; wherein the shoulder belt has a connecting member; and further comprising a spring connecting the connecting member of the shoulder belt to the plate part of the support member for preventing vibration of the support member from being transmitted to the connecting member.

16. A suspender according to claim 8; wherein the shoulder belt has a connecting member; and further comprising a spring connecting the connecting member of the shoulder belt to the plate part of the support member for preventing vibration of the support member from being transmitted to the connecting member.

17. A suspender according to claim 14; wherein the shoulder belt has a connecting member; and further comprising a spring connecting the connecting member of the shoulder belt to the plate part of the support member for preventing vibration of the support member from being transmitted to the connecting member.

* * * * *